US010566844B2

(12) United States Patent
Bito et al.

(10) Patent No.: US 10,566,844 B2
(45) Date of Patent: Feb. 18, 2020

(54) HYBRID ENERGY HARVESTING SYSTEMS AND DEVICES INCORPORATING THE SAME

(71) Applicant: Georgia Tech Research Corporation, Atlanta, GA (US)

(72) Inventors: Jo Bito, Dallas, TX (US); Emmanouil Tentzeris, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/276,943

(22) Filed: Feb. 15, 2019

(65) Prior Publication Data

US 2019/0252924 A1  Aug. 15, 2019

Related U.S. Application Data

(60) Provisional application No. 62/631,367, filed on Feb. 15, 2018.

(51) Int. Cl.
*H02J 50/20* (2016.01)
*H02J 50/30* (2016.01)
*H04B 1/16* (2006.01)
*H04M 19/08* (2006.01)

(52) U.S. Cl.
CPC .............. *H02J 50/20* (2016.02); *H02J 50/30* (2016.02); *H04B 1/1607* (2013.01); *H04M 19/08* (2013.01)

(58) Field of Classification Search
CPC ........ H02J 50/20; H02J 50/30; H04B 1/1607; H04M 19/08
See application file for complete search history.

(56) References Cited

U.S. PATENT DOCUMENTS

| 9,864,882 | B1 * | 1/2018 | Geist ................... G06K 7/10158 |
| 2008/0054638 | A1 * | 3/2008 | Greene ................... H02J 17/00 290/1 R |
| 2011/0175461 | A1 * | 7/2011 | Tinaphong .............. H02J 17/00 307/149 |
| 2014/0138432 | A1 * | 5/2014 | Park ...................... A61B 5/002 235/375 |
| 2015/0076909 | A1 * | 3/2015 | Biederman .......... G02B 27/017 307/44 |

* cited by examiner

*Primary Examiner* — Michael Y Mapa
(74) *Attorney, Agent, or Firm* — Troutman Sanders LLP; Ryan A. Schneider (57) ABSTRACT

A system including: a photovoltaic (PV) cell; a radio frequency (RF) rectifier; a DC-DC converter connected to an output of the RF rectifier; and a control circuit configured to control an operation of the DC-DC converter, and configured to receive operating power from the PV cell.

20 Claims, 7 Drawing Sheets

HYBRID ENERGY HARVESTING SYSTEMS AND DEVICES INCORPORATING THE SAME

CROSS-REFERENCE TO RELATED APPLICATIONS

This application claims benefit under 35 U.S.C. § 119(e) of U.S. Provisional Patent Application No. 62/631,367, filed Feb. 15, 2018. The entire contents and substance of the above application is incorporated herein by reference in its entirety as if fully set forth below.

FIELD

This application is generally related to hybrid energy harvesting systems, and, more particularly, to autonomous hybrid radio frequency/photovoltaic energy harvesting systems and devices incorporating the same.

BACKGROUND

Ambient energy harvesting systems are used in various applications to provide power without reliance on a power grid. Radio frequency (RF) energy sources are attractive because of RF's relative ubiquity and intrinsic ability to penetrate opaque walls, making it generally available at all times. However, typical ambient RF energy harvesters cannot generate output voltage that is high enough to power many circuits (such as integrated circuits (ICs)). This limits the use of RF energy harvesters in the related art to places having a strong RF energy source. Meanwhile, solar energy harvesting devices (e.g., photovoltaic (PV) cells) can provide high power when exposed to sunlight, but the power from a PV cell decreases at least linearly with decreases in light intensity. That is, the energy conversion efficiency of PV cells is limited with limited lighting by increased power losses that arise as the value of the devices shunt resistance becomes comparable to the characteristic resistance of the cell. Thus, solar energy harvesting devices can only provide intermittent power.

In the related art, hybrid energy harvesting systems utilizing multiple energy sources, for example solar and heat, have been used to improve the conversion efficiency and increase the available power over a single energy harvesting system. However, such related-art hybrid energy harvesting systems are not well-suited for low-power, but long-life applications, such as, for example, internet of things (IoTs) devices. For example, certain related art approaches utilizing both RF energy harvesters and solar energy harvesters fail to improve over the use of a solar energy harvest because most of the power is provided by solar cells. Thus, these types of devices traditionally heavily rely on a primary battery, which must be replaced. However, battery replacement can be time-consuming, labor intensive, and inefficient. Accordingly, there is needed a power source which can autonomously maintain the operation of these devices with ambient energy without heavy reliance on a battery.

Aspects of the present disclosure address these and other issues. Certain implementations consistent with the present disclosure utilize a unique and nonobvious configuration of converting power provided by a higher-density, low voltage power source into a higher-voltage, usable energy form, and controlling the converter with a higher-voltage but lower density energy source. Moreover, in some cases, the energy harvesters, converters, and fundamental circuit components may be formed using inkjet printing technology to provide exceptionally thing form-factor.

SUMMARY

According to some embodiments there is provided an energy harvesting system including: a photovoltaic (PV) cell; a radio frequency (RF) rectifier; a DC-DC converter connected to an output of the RF rectifier; and a control circuit configured to control an operation of the DC-DC converter, and configured to receive operating power from the PV cell.

The control circuit may include: an oscillator configured to signal activation of the DC-DC converter; and a timer configured to control the oscillator.

The control circuit may further include a switch electrically deposed between the PV cell and the oscillator, the switch being activated by the timer.

The control circuit may further include a capacitor connected to the oscillator.

The system may further include a matching circuit configured to provide input to the RF rectifier.

The system may further include an antenna configured to capture ambient RF signals and send the captured RF signals to the RF rectifier.

The antenna may be a dual-band antenna.

The antenna may be configured to simultaneously harvest energy over one port and communicate over a second port.

The antenna may include a reflector disposed to increase a gain of the antenna.

The antenna may include an omnidirectional antenna.

The antenna may include a rectangular short slot antenna.

The PV cell may be disposed within an inner loop of the antenna.

According to some embodiments, there is provided a device including: a solar cell; an antenna; a radio-frequency (RF) converter configured to convert RF signals captured by the antenna to electrical power; a power converter connected to an output of the RF converter; a control circuit configured to control an operation of the power converter, and configured to receive operating power from the solar cell; and a microcontroller configured to receive operating power from the power converter.

The device may further include a power storage configured to receive power from at least one of the power converter and the solar cell.

The device may further include a power switch connected to the power storage and the power converter, the power switch being configured to select a power source for the microcontroller from between the power storage and the power converter.

The power storage may include at least one of a battery and a capacitor.

The device may further include a transceiver connected to the microcontroller and the antenna, the transceiver being configured to control the antenna to simultaneously communicate over a first port of the antenna while harvesting energy over a second port of the antenna.

The device may further include a matching circuit electrically disposed between the RF converter and the antenna.

The control circuit may include: an oscillator configured to signal activation of the power converter; and a timer configured to control the oscillator.

According to some embodiments, there is provided a hybrid energy harvesting system including: a first energy harvesting device, the first energy harvesting device configured to produce high-voltage energy; a second energy harvesting device, the second energy harvesting device configured to produce low-voltage and high-density energy; a power converter connected to an output of the second energy harvesting device, the power converter configured to convert energy produced by the second energy harvesting device into a high-voltage energy; and a control circuit configured to control an operation of the power converter, and configured to receive operating power from the first energy harvesting device.

BRIEF DESCRIPTION OF THE FIGURES

Reference will now be made to the accompanying figures and diagrams, which are not necessarily drawn to scale, and wherein.

DETAILED DESCRIPTION

To facilitate an understanding of the principles and features of the disclosure, various illustrative embodiments are explained below. In particular, the presently disclosed subject matter relates utilizing a higher-voltage but lower energy source to operate a power management circuit to convert a higher-density, but lower voltage power source into a higher-voltage, usable energy form. One challenge overcame by the inventors was identifying a combination of energy sources to support an autonomous system without heavy reliance on battery power capable of operating across a range of realistic environments, as opposed to a theoretic, ideal condition. For example, in some cases, a solar cell is used as a voltage source to operate an extremely low-power-required power management circuit to convert energy from an RF-DC conversion circuit into a high voltage usable form to provide main power in a system. A first type of energy harvesting devices (e.g., solar cells) produces sufficient voltage to run a circuit, even when total power output is insufficient to run a larger system (such as a night). A second type of energy harvesting devices (e.g., RF rectifiers) produces unusable power (e.g., relatively low voltage) but in sufficient quantities (watts) for powering a larger system. An insight of the inventors is using the first type of energy harvesting device to control a low-powered converter, thereby transforming the energy produced by the second type of energy harvesting device into usable energy (e.g., having sufficient voltage). A hybrid energy harvesting system according to the present disclosure may autonomously provide power to a system and/or power storage with usable ranges of voltage.

Various devices, systems, and methods incorporating aspects consistent with the present disclosure, and example embodiments of the present disclosure will now be described with reference to the accompanying figures.

Figure 1:
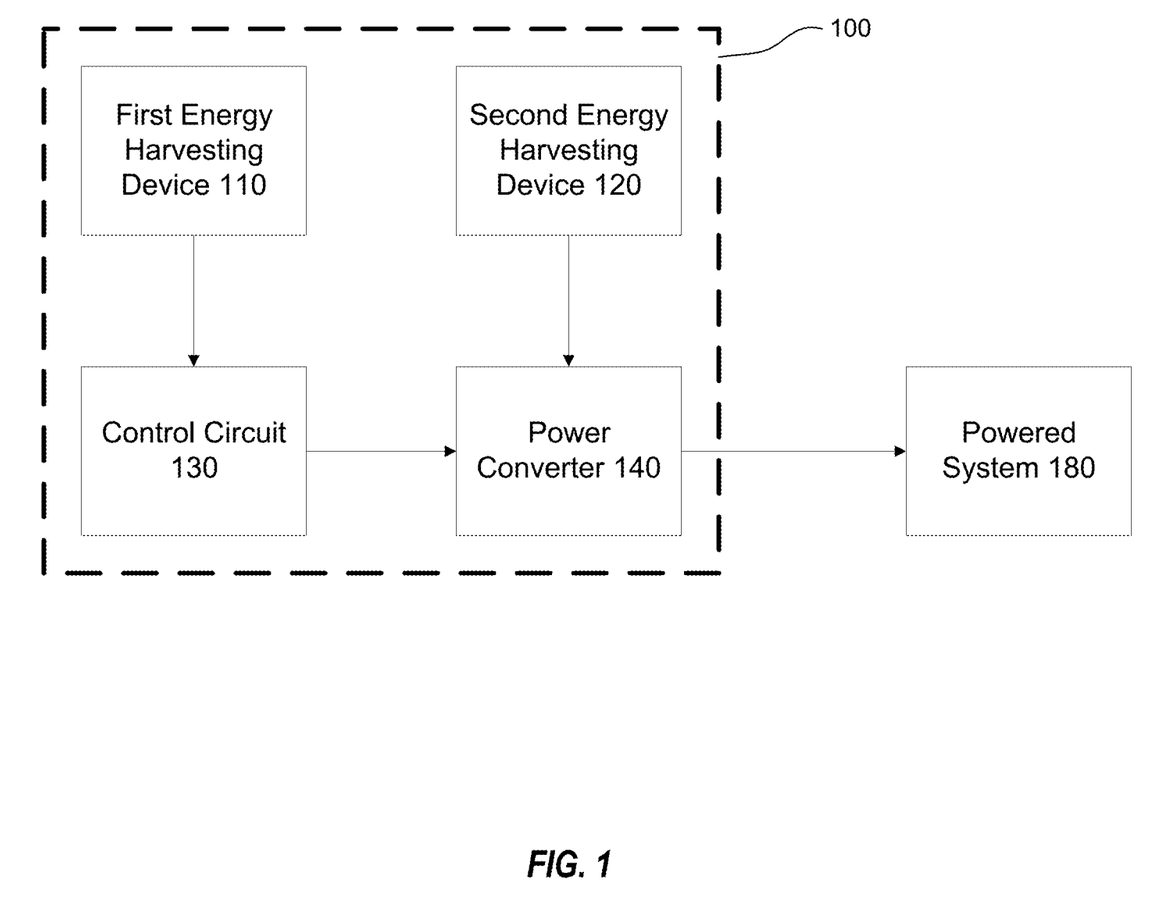
FIGS. 1-3 are block diagrams illustrating hybrid energy harvesting systems according to example embodiments.

FIG. 1 is a block diagram of an example hybrid energy harvesting system 100 according to an example embodiment. Referring to FIG. 1, hybrid energy harvesting system 100 includes first energy harvesting device 110, second energy harvesting device 120, control circuit 130, and power converter 140. Power converter 140 converts power from second energy harvesting device 120 under the control of control circuit 130 and provides operating power to powered system 180.

First energy harvesting device 110 may be a high-voltage energy harvesting system 110. For example, first energy harvesting device 110 may include a photovoltaic (PV) or solar cell. As will be understood by one of ordinary skill, the available DC power from a PV cell may decrease substantially linearly with decreases to light intensity. However, open voltage of a PV cell may decrease substantially linearly to the logarithmic scale of decreased to light intensity. Thus, even under low lighting conditions, a PV cell may maintain a high enough voltage gradient to power a low powered-circuit (e.g., such as control circuit 130) even under indoor, twilight, or night conditions (e.g., 440 nW per $cm^2$ irradiation).

Second energy harvesting device 120 may be a low-voltage harvesting system 120. For example, second energy harvesting device 120 may include an RF energy harvesting system. As will be understood by one of ordinary skill, RF energy harvesting systems produce sufficient power to operate systems (e.g., system 180), but insufficient voltage. For instance, typical integrated circuits, such as micro-controllers, require an operation voltage above 1.5 V, while typical RF energy harvesting systems produce power below 0.3 V.

Control circuit 130 may be powered by power from first energy harvesting device 110. Control circuit 130 controls power converter 140 to convert power from second energy harvesting device 120. As will be discussed below in greater detail with reference to FIGS. 2-4, control circuit 130 may include a timer and an oscillator that periodically instruct power converter 140 to perform power conversion. Control circuit 130 may be an ultra-low power circuit.

Power converter 140 may convert power harvested by second energy harvesting device 120 into power usable by powered system 180. Power converter 140 may be a DC-DC power converter configured to upconvert the voltage of the energy harvested by second energy harvesting device 120. Example power converters 140 will be discussed below in greater detail with reference to FIGS. 2-4.

Powered system 180 may be a main system powered by hybrid energy harvesting system 100. As a non-limiting example, powered system 180 may include an integrated circuit, a microcontroller (e.g., an MSP430 microcontroller unit (MCU)), or the like. Hybrid energy harvesting system 100 and powered system 180 may be packaged together as an Internet-of-Things (IoT) device. In some cases, the device may be a sensor, such as an environmental or indoor sensor. In some cases, one or more devices may be used as sensors to enable smart agriculture, structure health monitoring, and/or human activity monitoring.

Figure 2:
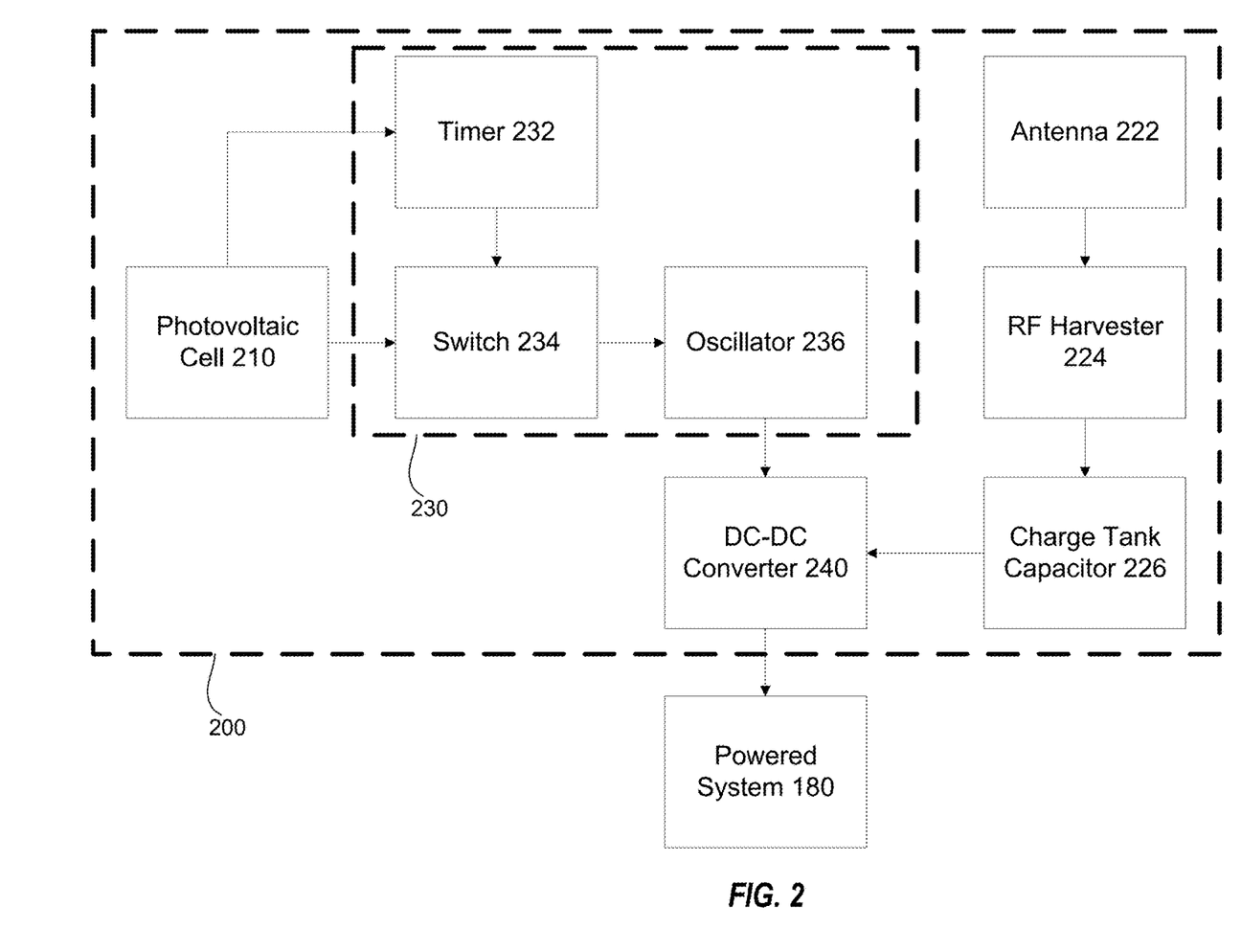

FIG. 2 is a block diagram of an example hybrid energy harvesting system 200 according to an example embodiment. Referring to FIG. 2, hybrid energy harvesting system 200 includes PV cell 210, antenna 222, RF harvester 224, charge tank capacitor 226, timer 232, switch 234, oscillator 236, and DC-DC converter 240. Timer 232, switch 234, and oscillator 236 may form a control circuit 230 for DC-DC converter 240. DC-DC converter 240 converts power from RF harvester 224 under the control of control circuit 230 and provides operating power to powered system 180.

PV cell 210 provides power to operate control circuit 230. For example, PV cell 210 may provide power to timer 232 and switch 234. PV cell 210 may be selected to provide highest voltage under low irradiation. For example, PV cell 210 may be a Panasonic™ AM-5610CAR 25 mm by 20 mm amorphous silicon solar cell. Timer 232 may be, for example, a nano-timer such as Texas Instruments™ TPL5100 ultra low power timer, and may consumer power below 50 nW. Timer 232 may generate short-duration pulse signals with operation frequencies below 0.1 Hz to operation of oscillator 236 through switch 234. Switch 234 may be, for example, a MOSFET switch. Oscillator 236 may have relatively high power and frequency (as compared to timer 232). For example, oscillator 236 may operate on 1 to 5 µW at 5 to 90 kHz oscillation frequencies. Oscillator 236 triggers DC-DC converter 240. Oscillator 236 may be, for example, a Silicon Labs™ TS3001 oscillator.

Antenna 222 receives RF signals (e.g., ambient RF signals). As an example, antenna 222 may be an antenna tuned to the 2.4 GHz ISM band. However, this is merely an example, and antenna 222 may be tuned to a different RF band, multiple RF bands, and/or may be programmable. RF harvester 224 converts the RF signal detected by antenna 222 to electrical power (e.g., DC power). For example, RF harvester 224 may be an RF-DC converter. RF harvester 224 charges charge tank capacitor 226. RF harvester 224 may include an RF rectifier. DC-DC convertor 240 converts the power stored on charge tank capacitor 226 to a relatively high voltage to provide operating power to powered system 180.

Although FIG. 2 depicts DC-DC converter 240 providing power directly to powered system 180, this is merely an example. In some cases, DC-DC converter 240 may provide power to an energy storage device (e.g., a capacitor or battery) which then provides power to system 180. Additionally, in some embodiments, PV cell 210 may provide power to system 180 and/or to an intermediary storage device, such as in cases where PV cell 210 produces more power than needed to operate control circuit 230 (e.g., under direct sunlight).

Figure 3:
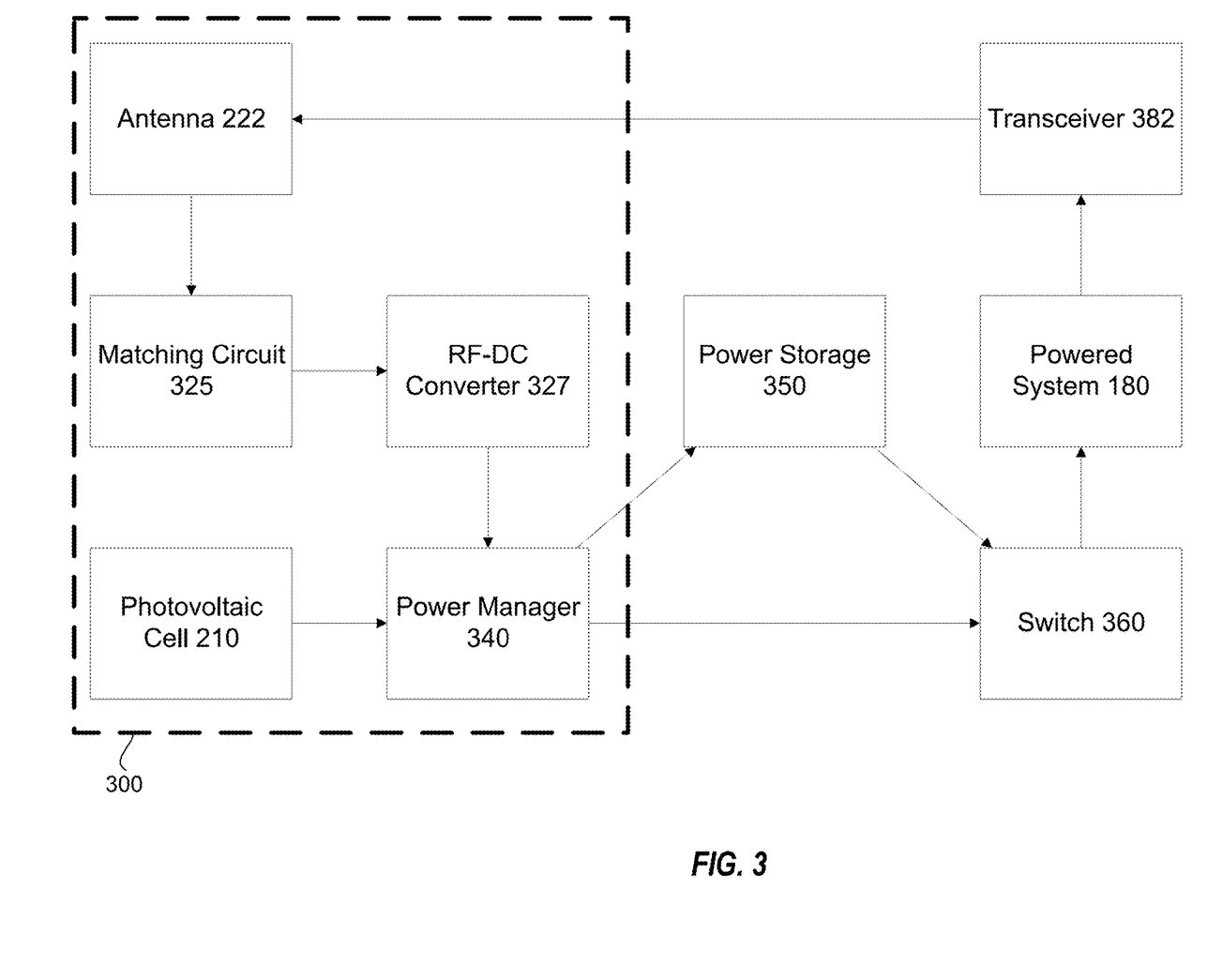

FIG. 3 is a block diagram of an example hybrid energy harvesting system 300 according to an example embodiment. Referring to FIG. 3, hybrid energy harvesting system 300 includes PV cell 210, antenna 222, matching circuit 325, RF-DC converter 327, and power manager 340. Power manager 340 may include a control circuit (e.g., control circuit 130 or 230) which is powered by PV cell 210 and a DC-DC converter (e.g., DC-DC converter 240) that converts power from RF-DC converter 327 under the control of the control circuit and provide operating power to power storage 350 and/or powered system 180 through switch 360.

Antenna 222 receives RF signals (e.g., ambient RF signals). As an example, antenna 222 may be an antenna tuned to the 2.4 GHz band. Antenna 222 may be, for example, a dual-port antenna, and may be tuned to a plurality of RF bands. In some cases, antenna 222 may also output signals and/or receive data signals, for example, under the control of transceiver 382 and/or powered system 180. Matching circuit 325 may be selected to maximize (or attempt to maximize) DC output power from RF-DC converter 327 for a given RF available input power. In some cases, matching circuit 325 may be optimized to the minimum RF power required to power system 180.

RF-DC converter 327 converts the RF signal captured by antenna 222 to DC power and supplies the same to power manager 340. PV cell 210 provides operating power to power manager 340 (e.g., to control circuit 130 or 230). Power manager 340 converts the power from RF-DC converter 327 into usable power (e.g., by up-converting the voltage using a DC-DC converter), and provides power to power storage 350 and/or switch 360. For example, power manager 340 may provide power to switch 360 up to a necessary operating power of powered system 180, but otherwise provide power to charge power storage 350. Power manager 340 may be a power management unit (PMU), such as a Texas Instruments™ BQ25504 PMU.

Power storage 350 may include a capacitor and/or a battery, and may provide emergency power and/or cold-start power (e.g., while RF-DC converter 327 is charging) to system 180. Switch 360 may trigger operation of system 180. In some cases, power storage 350 and/or power manager 340 may provide power to powered system 180. In some cases, power storage 350 may provide power to powered system 180 through power manager 340. Power manager 340 may selectively supply power to powered system 180 from PV cell 210, RF-DC converter 327 and/or power storage 350 (e.g., through a blended power supply). Powered system 180 may include, for example, a microcontroller, such as MSP430 microcontroller unit (MCU). Powered system 180 may use transceiver 382 to communicate with remote systems. For example, transceiver 381 may communicate with one band of antenna 222 to send and receive information. Transceiver 382 may be, for example, a CC2500 transceiver.

Figure 4:
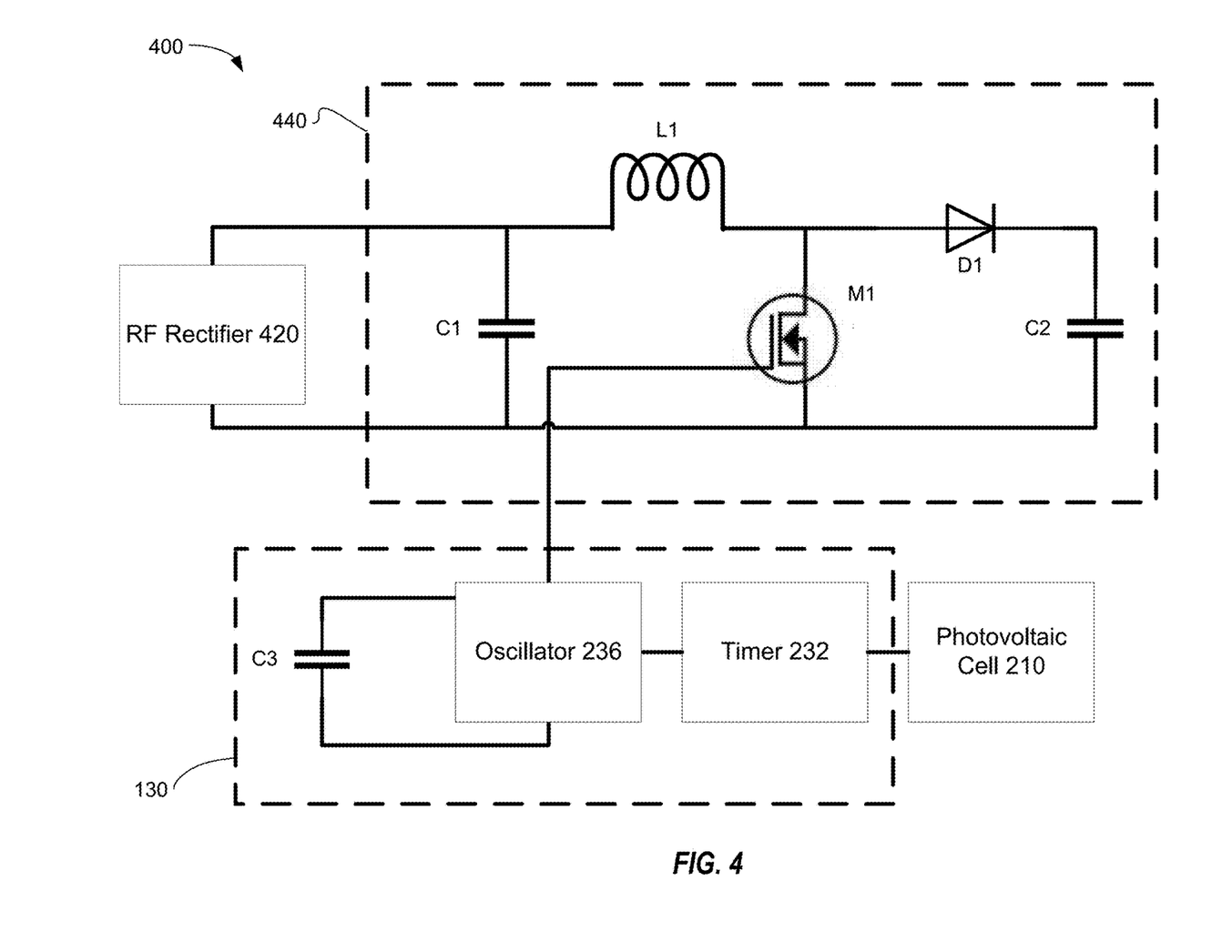
FIGS. 4 and 5 are schematic component diagrams of a hybrid energy harvesting system according to example embodiments.

FIG. 4 is a schematic component diagram of a hybrid energy harvesting system 400 according to an example embodiment. Hybrid energy harvesting system includes PV cell 210, RF rectifier 420, control circuit 430, and DC-DC converter 440. Control circuit 430 includes timer 232 oscillator 236, and capacitor C3. DC-DC converter 440 includes capacitors C1 (e.g., charge tank capacitor 226) and C2 (e.g., $C_{out}$), inductor L1, diode D1 (e.g., a Schittky diode), and switch M1 (e.g., a MOSFET switch). PV cell 210 may convert irradiation to electrical energy to power control circuit 430. RF rectifier 420 may convert RF signals (e.g., detected by antenna 222) into electrical power. DC-DC converter 440 may convert the power from RF rectifier 420 into power having a higher voltage. Switch M1 may be controlled by control circuit 430. Control circuit 430 may be substantially similar to that described above with reference to FIG. 2.

Figure 5:
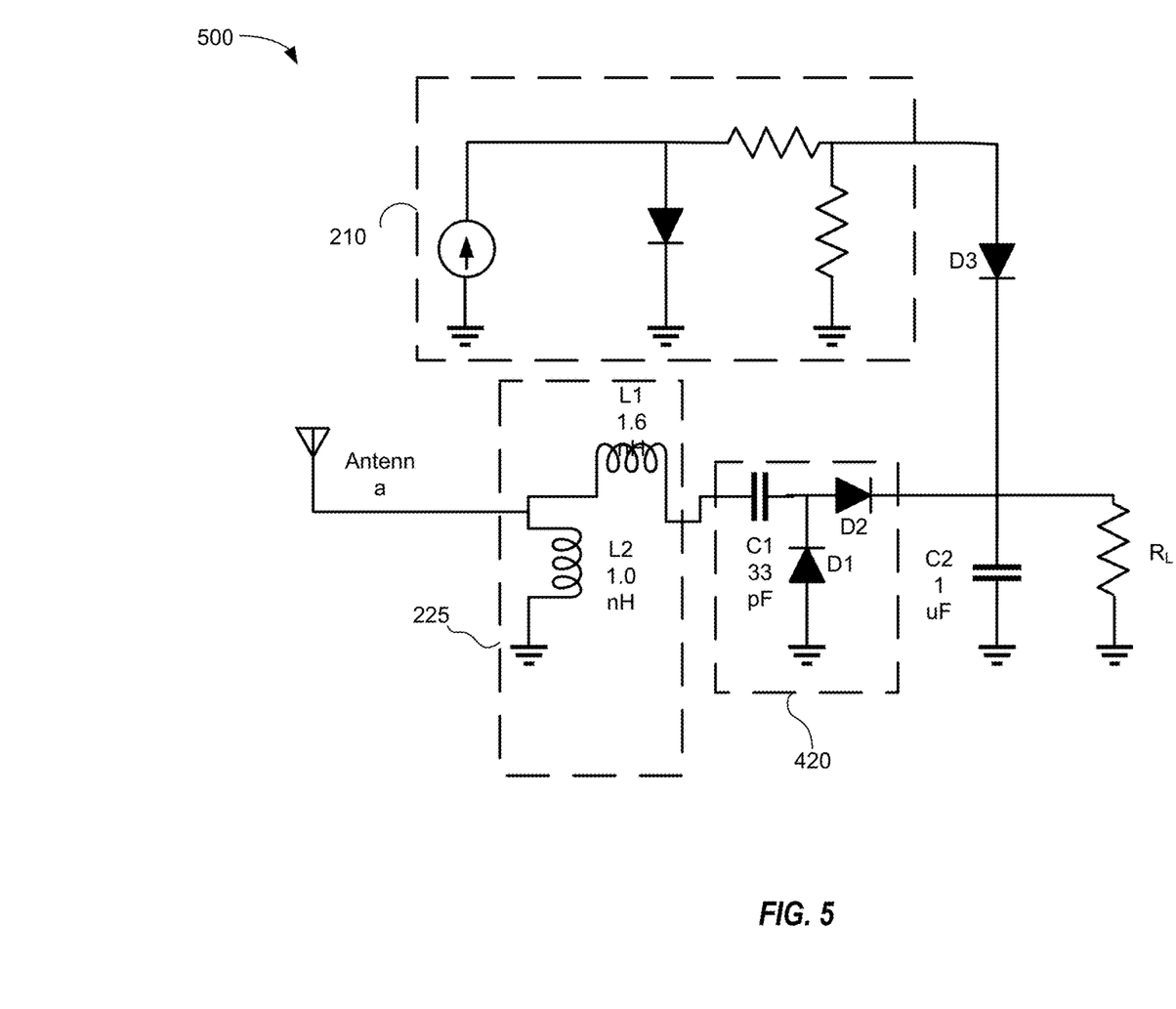

FIG. 5 is a schematic component diagram of a hybrid energy harvesting system 500 according to an example embodiment. Hybrid energy harvesting system 500 includes PV cell 210, antenna 222, matching circuit 225, and RF rectifier 420. PV cell 210 is represented by a current source, a diode, and a resistor in parallel and connected to a second resistor. Matching circuit 225 is represented by an input from antenna 222 connected to a first inductor L1 going to the RF rectifier 420, and a second inductor L2 going to ground. RF rectifier 420 receives an input from matching circuit 225, feeds it through a first capacitor C1 which feeds to a first diode D1 to ground, and a second diode D2 to the remainder of the hybrid energy harvesting system 500. The remaining depicted components are a third diode, a second capacitor and a load resistance (representative of the overall system.

One of ordinary skill will recognize that the schematic component diagrams of FIGS. 4 and 5 are for discussion purposes only, and various additional or alternative components may be included in a hybrid energy harvesting system while remaining within the scope of the present disclosure.

In some embodiments, the hybrid energy harvesting system (e.g., 100, 200, 300, and/or 400) may be printed (e.g., ink-jet printed and/or 3D printed). For example, hybrid energy harvesting system may be formed into a single package with an FDM printer with polylactic acid (PLA)-based material. Since both RF and solar energy harvesters (as well as fundamental circuit components such as antenna 222) are well compatible with inkjet printing technology, which is the key enabler of low-cost IoT device fabrication. By taking advantage of multi-disciplinary material printing capability of inkjet and 3D printing technologies, PV cell, RF harvester, battery/capacitor can be fabricated only utilizing additive manufacturing technologies. This is an additional difference over the related art. In some cases, a PV cell may be attached separately to the remainder of the hybrid energy harvesting system (e.g., attached on the top of the communication/harvesting board). As will be understood by one of ordinary skill, in order for the hybrid energy harvesting system to be printed, in some cases, an ink formulation must be changed depending on the type of printer used. Furthermore, by nature of printing, the material used to form the various components must be usable in a liquid form, creating certain limitations.

As discussed above, antenna 222 may be a dual-port antenna 222 that can be used for both energy harvesting and communication. As non-limiting examples, antenna 222 may be a Yagi antenna, patch antenna, horn antenna, loop antenna, bow-tie antenna, and/or dipole/monopole antenna. In some cases, both energy harvesting and communication may utilize a same band. Thus, the antenna 222 may require high two-port isolation. The inventors identified a rectangular shorted slot antenna, but discovered a challenge in designing an antenna capable of this dual-port operation while sharing a same rectangular slot. Design and location of the feeding transmission lines as well size and height of the ground plane are significant in realizing a good matching for both ports and a simultaneous high isolation between the two ports. Moreover, by adding a reflector to the bottom of the antenna package, gain of the omnidirectional antenna was increased. Perspective and top views of an example antenna 222 are depicted in (a) and (b) of FIG. 6, respectively. Example dimensions are provided below in Table 1. One of ordinary skill will recognize that these dimensions may be adjusted within ranges while still maintaining sufficiently similar characteristics, and that alternative antenna 222 configurations would be known or determinable by one of ordinary skill in light of the present disclosure.

TABLE 1

| | Parameter | | | | | | |
|---|---|---|---|---|---|---|---|
| | $H_{in}$ | $H_{out}$ | $L_{in}$ | $L_{out}$ | $L_{F1}$ | $L_{F2}$ | L |
| Length (mm) | 18 | 20 | 45 | 47 | 13.5 | 10 | 31 |
| | Parameter | | | | | | |
| | $W_{F1}$ | $W_{F2}$ | $W_{50}$ | $S_W$ | $S_L$ | $T_P$ | G |
| Length (mm) | 4 | 7 | 1.46 | 0.9 | 4.6 | 1 | 1.6 |

Figure 6:
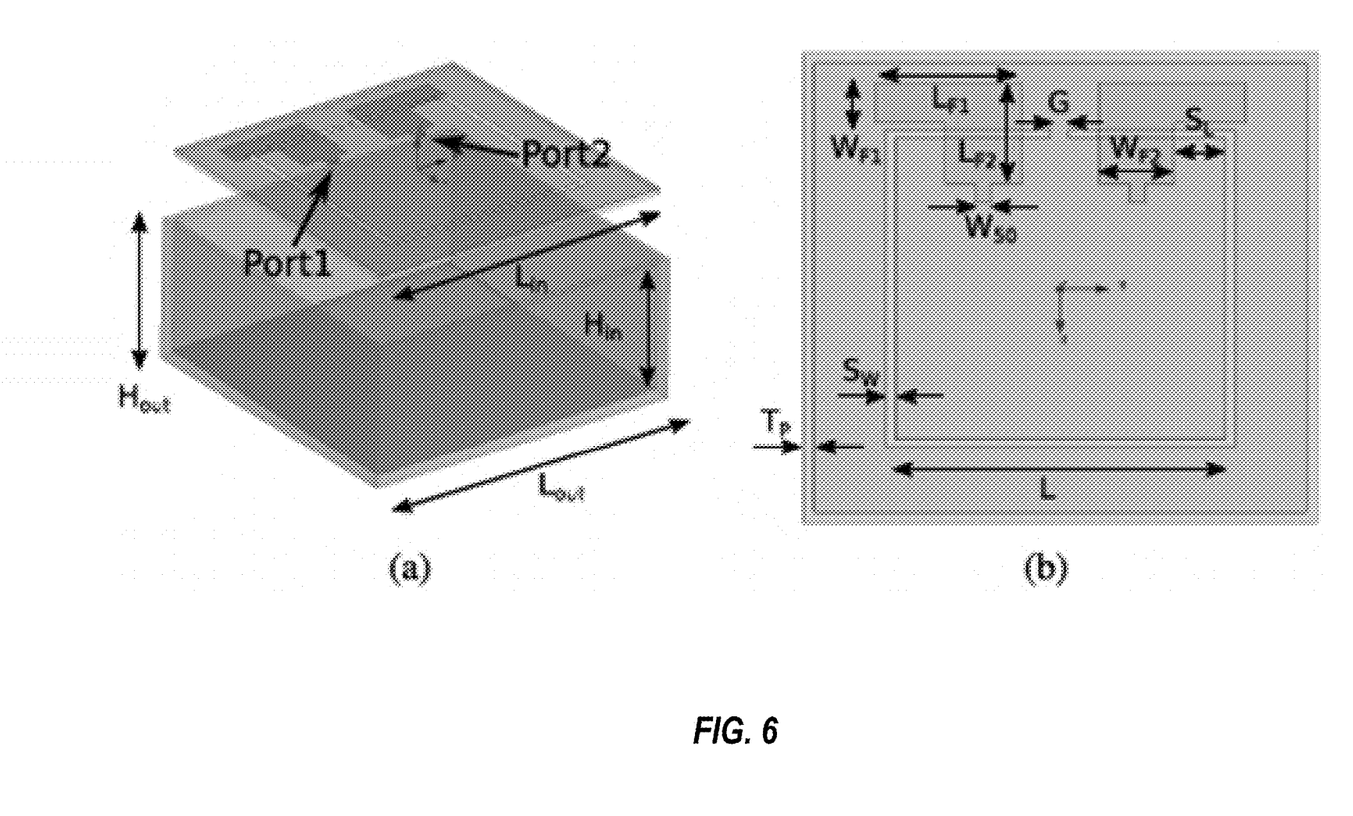
FIG. 6 illustrates perspective and top views of an example antenna that may be used with certain example embodiments.

In some embodiments, PV cell 210 may be selected to fit within a conductive surface of antenna 222. Positioning the PV cell 210 within an inner loop area of antenna 222 reduces interference between PV cell 210 and antenna 222. For example, PV cell 210 may be formed using Power Film MP3025 solar cell, and may be dimensioned to fit within a conductive surface of antenna 222.

Figure 7:
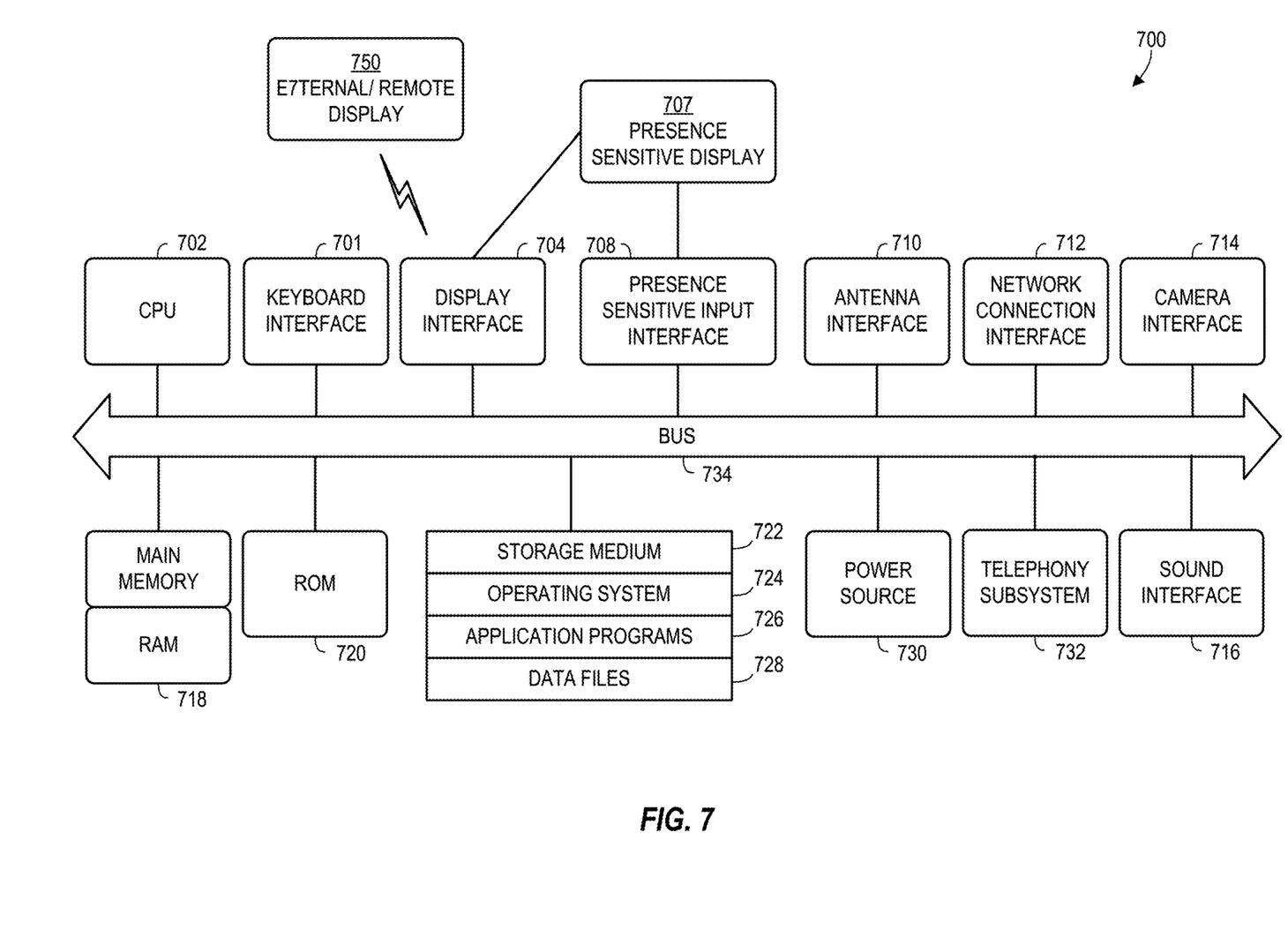
FIG. 7 is a computer architecture diagram that may be used to implement certain features of the present disclosure.

Aspects of the disclosed technology may be implemented using at least some of the components illustrated in the computing device architecture 700 of FIG. 7. For example, system 180 may be implemented with one or more of the components depicted in FIG. 7. As shown, the computing device architecture includes a central processing unit (CPU) 702, where computer instructions are processed; a display interface 704 that acts as a communication interface and provides functions for rendering video, graphics, images, and texts on the display. In certain example implementations of the disclosed technology, the display interface 704 may be directly connected to a local display, such as a touch-screen display associated with a mobile computing device. In another example implementation, the display interface 704 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 704 may wirelessly communicate, for example, via a Wi-Fi channel or other available network connection interface 712 to the external/remote display.

In an example implementation, the network connection interface 712 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 704 may be operatively coupled to a local display, such as a touch-screen display associated with a mobile device. In another example, the display interface 704 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 704 may wirelessly communicate, for example, via the network connection interface 712 such as a Wi-Fi transceiver to the external/remote display.

The computing device architecture 700 may include a keyboard interface 706 that provides a communication interface to a keyboard. In one example implementation, the computing device architecture 700 may include a presence-sensitive display interface 708 for connecting to a presence-sensitive display 707. According to certain example implementations of the disclosed technology, the presence-sensitive display interface 708 may provide a communication interface to various devices such as a pointing device, a touch screen, a depth camera, etc. which may or may not be associated with a display.

The computing device architecture 700 may be configured to use an input device via one or more of input/output interfaces (for example, the keyboard interface 706, the display interface 704, the presence sensitive display interface 708, network connection interface 712, camera interface 714, sound interface 716, etc.) to allow a user to capture information into the computing device architecture 700. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 700 or may be a separate device. For example, the input device may be an accelerometer, a magnetometer, a digital camera, a microphone, and an optical sensor.

Example implementations of the computing device architecture 700 may include an antenna interface 710 that provides a communication interface to an antenna; a network connection interface 712 that provides a communication interface to a network. As mentioned above, the display interface 704 may be in communication with the network connection interface 712, for example, to provide information for display on a remote display that is not directly connected or attached to the system. In certain implementations, a camera interface 714 is provided that acts as a communication interface and provides functions for capturing digital images from a camera. In certain implementations, a sound interface 716 is provided as a communication interface for converting sound into electrical signals using a microphone and for converting electrical signals into sound using a speaker. According to example implementations, a random-access memory (RAM) 718 is provided, where computer instructions and data may be stored in a volatile memory device for processing by the CPU 702.

According to an example implementation, the computing device architecture 700 includes a read-only memory (ROM) 720 where invariant low-level system code or data for basic system functions such as basic input and output (I/O), startup, or reception of keystrokes from a keyboard are stored in a non-volatile memory device. According to an example implementation, the computing device architecture 700 includes a storage medium 722 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 724, application programs 726 (including, for example, a web browser application, a widget or gadget engine, and or other applications, as necessary) and data files 728 are stored. According to an example implementation, the computing device architecture 700 includes a power source 730 that provides an appropriate alternating current (AC) or direct current (DC) to power components.

According to an example implementation, the computing device architecture 700 includes and a telephony subsystem 732 that allows the device 700 to transmit and receive sound over a telephone network. The constituent devices and the CPU 702 communicate with each other over a bus 734.

According to an example implementation, the CPU 702 has appropriate structure to be a computer processor. In one arrangement, the CPU 702 may include more than one processing unit. The RAM 718 interfaces with the computer bus 734 to provide quick RAM storage to the CPU 702 during the execution of software programs such as the operating system application programs, and device drivers. More specifically, the CPU 702 loads computer-executable process steps from the storage medium 722 or other media into a field of the RAM 718 in order to execute software programs. Data may be stored in the RAM 718, where the data may be accessed by the computer CPU 702 during execution. In one example configuration, the device architecture 700 includes at least 78 MB of RAM, and 256 MB of flash memory.

The storage medium 722 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 722, which may comprise a machine-readable storage medium.

According to one example implementation, the term computing device, as used herein, may be a CPU, or conceptualized as a CPU (for example, the CPU 702 of FIG. 7). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although various specific components have been discussed herein, these are merely examples. One of ordinary skill will recognize that aspects of the present disclosure could be readily applied with various alternatives components.

What is claimed is:

1. A system comprising:
a photovoltaic (PV) cell;
a radio frequency (RF) rectifier;
a DC-DC converter connected to an output of the RF rectifier; and
a control circuit configured to:
control an operation of the DC-DC converter; and
receive operating power from the PV cell;
wherein the control circuit comprises:
an oscillator configured to signal activation of the DC-DC converter; and
a timer configured to control the oscillator.

2. The system of claim 1, wherein the control circuit further comprises a switch electrically deposed between the PV cell and the oscillator, the switch being activated by the timer.

3. The system of claim 1, wherein the control circuit further comprises a capacitor.

4. The system of claim 1 further comprising a matching circuit configured to provide input to the RF rectifier.

5. The system of claim 1 further comprising an antenna configured to:
capture ambient RF signals; and
send the captured RF signals to the RF rectifier.

6. The system of claim 5, wherein the antenna is a dual-band antenna.

7. The system of claim 6, wherein the antenna is configured to simultaneously harvest energy over one port and communicate over a second port.

8. The system of claim 5, wherein the antenna comprises a reflector configured to increase a gain of the antenna.

9. The system of claim 5, wherein the antenna comprises an omnidirectional antenna.

10. The system of claim 5, wherein the antenna comprises a rectangular short slot antenna.

11. The system of claim 5, wherein the PV cell is disposed within a conductive surface of the antenna.

12. The device of claim 1, wherein:
the PV cell is configured to produce high-voltage energy;
the RF rectifier is configured to produce low-voltage and high-density energy; and
the DC-DC converter is configured to convert energy produced by the RF rectifier into a high-voltage energy.

13. A device comprising:
a solar cell;
a radio-frequency (RF) converter configured to convert RF signals to electrical power;
a power converter connected to an output of the RF converter;
a control circuit configured to:
control an operation of the power converter; and
receive operating power from the solar cell; and
a microcontroller configured to receive operating power from the power converter;
wherein the control circuit comprises:
an oscillator configured to signal activation of the power converter; and
a timer configured to control the oscillator.

14. The device of claim 13 further comprising a power storage configured to receive power from at least one of the power converter and the solar cell.

15. The device of claim 14 further comprising a power switch connected to the power storage and the power converter, the power switch being configured to select a power source for the microcontroller from between the power storage and the power converter.

16. The device of claim 14, wherein the power storage comprises at least one of a battery and a capacitor.

17. The device of claim 13 further comprising:
an antenna; and
a transceiver connected to the microcontroller and the antenna;
wherein the transceiver is configured to control the antenna to simultaneously communicate over a first port of the antenna while harvesting energy over a second port of the antenna.

18. The device of claim 13 further comprising:
an antenna; and
a matching circuit electrically disposed between the RF converter and the antenna.

19. The device of claim 13 further comprising an antenna; wherein the RF converter is configured to convert RF signals captured by the antenna to electrical power.

20. The device of claim 13, wherein:
the solar cell is configured to produce high-voltage energy;
the RF converter is configured to produce low-voltage and high-density energy; and
the power converter is configured to convert energy produced by the RF converter into a high-voltage energy.

* * * * *